United States Patent
Peng et al.

(10) Patent No.: US 9,509,366 B2
(45) Date of Patent: Nov. 29, 2016

(54) INTERFERENCE ESTIMATION CIRCUIT AND METHOD

(75) Inventors: Chi-Yuan Peng, Taipei County (TW); Chih-Chiu Wang, Taipei County (TW)

(73) Assignee: VIA TECHNOLOGIES, INC., Hsin-Tien, Taipei (TW)

( * ) Notice: Subject to any disclaimer, the term of this patent is extended or adjusted under 35 U.S.C. 154(b) by 926 days.

(21) Appl. No.: 11/696,303

(22) Filed: Apr. 4, 2007

(65) Prior Publication Data

US 2008/0247472 A1 Oct. 9, 2008

(51) Int. Cl.
*H04B 1/707* (2011.01)
*H04B 1/7097* (2011.01)
*H04L 1/00* (2006.01)

(52) U.S. Cl.
CPC ........... *H04B 1/7097* (2013.01); *H04L 1/0048* (2013.01); *H04B 2201/70706* (2013.01)

(58) Field of Classification Search
USPC ................................. 375/130, 140, 147, 148
See application file for complete search history.

(56) References Cited

U.S. PATENT DOCUMENTS

| | | | | |
|---|---|---|---|---|
| 5,894,473 | A * | 4/1999 | Dent | 370/342 |
| 5,940,433 | A * | 8/1999 | Sawahashi et al. | 375/149 |
| 5,956,368 | A * | 9/1999 | Jamal et al. | 375/146 |
| 6,034,952 | A | 3/2000 | Dohi et al. | |
| 6,137,788 | A * | 10/2000 | Sawahashi et al. | 370/342 |
| 6,825,802 | B2 * | 11/2004 | Warloe | 342/357.59 |
| 2002/0131382 | A1 * | 9/2002 | Kim et al. | 370/335 |
| 2003/0124995 | A1 * | 7/2003 | Tanaka | H04B 7/0634 455/101 |
| 2004/0170220 | A1 * | 9/2004 | Hackett | 375/148 |
| 2005/0143117 | A1 | 6/2005 | Jalloul et al. | |
| 2005/0281358 | A1 | 12/2005 | Bottomley et al. | |
| 2006/0251154 | A1 * | 11/2006 | Ettorre et al. | 375/148 |
| 2008/0043680 | A1 * | 2/2008 | Fitton | 370/335 |

FOREIGN PATENT DOCUMENTS

WO 03063375 A1 7/2003

OTHER PUBLICATIONS

"Robust SIR Estimation Method in Multiple Antenna CDMA System for High Data Rate Packet Communication" Seok Ho Won et al.
India Office Action mailed Apr. 30, 2010.

* cited by examiner

*Primary Examiner* — Kevin M Burd
(74) *Attorney, Agent, or Firm* — McClure, Qualey & Rodack, LLP

(57) ABSTRACT

The present application provides an interference estimation circuit which includes a signal generator, a first symbol extractor and a first mixer. The signal generator generates an orthogonal signal orthogonal to partial symbols of a plurality of pilot signals. The first symbol extractor extracts partial symbols of a first decoded signal decoded from a received signal wherein the first decoded signal contains one of the plurality of pilot signals, and includes an input node for receiving the first decoded signal and an output node for outputting a first extracted signal. The first extracted signal is substantially orthogonal to the orthogonal signal. The first mixer is coupled to the signal generator for receiving the orthogonal signal and to the first symbol extractor for receiving the first extracted signal, and outputs a first mixed signal of the orthogonal signal and the first extracted signal for interference estimation.

18 Claims, 12 Drawing Sheets

Assume $H_{ant\,1,1} = H_{ant\,1,0} + \Delta_{ant\,1}$, $H_{ant\,1,2} = H_{ant\,1,0} + 2\Delta_{ant\,1}$, $H_{ant\,1,3} = H_{ant\,1,0} + 3\Delta_{ant\,1}, \ldots, H_{ant\,1,9} = H_{ant\,1,0} + 9\Delta_{ant\,1}$
and $H_{ant\,2,1} = H_{ant\,2,0} + \Delta_{ant\,2}$, $H_{ant\,2,2} = H_{ant\,2,0} + 2\Delta_{ant\,2}$, $H_{ant\,2,3} = H_{ant\,2,0} + 3\Delta_{ant\,2}, \ldots, H_{ant\,2,9} = H_{ant\,2,0} + 9\Delta_{ant\,2}$

FIG. 3 (PRIOR ART)

|     |              |              |              |              |              |              |
|-----|--------------|--------------|--------------|--------------|--------------|--------------|
| 51  | A            | -A           | -A           | A            | A            | -A ...       |
| 52  | A·(H+Δ)      | -A·(H+2Δ)    | -A·(H+3Δ)    | A·(H+4Δ)     | A·(H+5Δ)     | -A·(H+6Δ) ...|
| 53  | A·(H+Δ)      | -A·(H+2Δ)    | -A·(H+3Δ)    | A·(H+4Δ)     |              |              |
| 54  | A            | -A           | A            | -A           |              |              |
| 55  | A²·(H+Δ)     | A²·(H+2Δ)    | -A²·(H+3Δ)   | -A²·(H+4Δ)   |              |              |

FIG. 5

| | | | | | | | | |
|---|---|---|---|---|---|---|---|---|
| 71 | A | A | A | A | A | A | A | ... |
| 72 | A | -A | A | -A | A | -A | -A | ... |
| 73 | $A \cdot (H_1+\Delta_1)$ | $A \cdot (H_1+2\Delta_1)$ | $A \cdot (H_1+3\Delta_1)$ | $A \cdot (H_1+4\Delta_1)$ | $A \cdot (H_1+5\Delta_1)$ | $A \cdot (H_1+\Delta_1)$ | ... |
| 74 | $A \cdot (H_2+\Delta_2)$ | $-A \cdot (H_2+2\Delta_2)$ | $A \cdot (H_2+3\Delta_2)$ | $-A \cdot (H_2+4\Delta_2)$ | $A \cdot (H_2+5\Delta_2)$ | $-A \cdot (H_2+\Delta_2)$ | ... |
| 75 | $A \cdot (H_1+\Delta_1)$ | $A \cdot (H_1+2\Delta_1)$ | $A \cdot (H_1+3\Delta_1)$ | $A \cdot (H_1+4\Delta_1)$ | | | |
| 76 | $A \cdot (H_2+\Delta_2)$ | $-A \cdot (H_2+2\Delta_2)$ | $A \cdot (H_2+3\Delta_2)$ | $-A \cdot (H_2+4\Delta_2)$ | | | |
| 77 | A | -A | A | -A | | | |
| 78 | $A^2 \cdot (H_1+\Delta_1)$ | $-A^2 \cdot (H_1+2\Delta_1)$ | $A^2 \cdot (H_1+3\Delta_1)$ | $-A^2 \cdot (H_1+4\Delta_1)$ | | | |
| 79 | $A^2 \cdot (H_2+\Delta_2)$ | $A^2 \cdot (H_2+2\Delta_2)$ | $-A^2 \cdot (H_2+3\Delta_2)$ | $-A^2 \cdot (H_2+4\Delta_2)$ | | | |

FIG. 7

| | | Slot 14 | | Frame boundary | | | Slot 0 | | | |
|---|---|---|---|---|---|---|---|---|---|---|
| 81 — | A | A | | | A | A | A | A | A | |
| 82 — | A | -A | | | A | -A | -A | A | A | |
| 83 — | $A \cdot (H_1+3\Delta_1)$ | $A \cdot (H_1+4\Delta_1)$ | | | $A \cdot H_1$ | $A \cdot (H_1+\Delta_1)$ | $A \cdot (H_1+2\Delta_1)$ | $A \cdot (H_1+3\Delta_1)$ | $A \cdot (H_1+4\Delta_1)$ | |
| 84 — | $A \cdot (H_2+3\Delta_2)$ | $A \cdot (H_2+4\Delta_2)$ | | | $A \cdot H_2$ | $-A \cdot (H_2+\Delta_2)$ | $-A \cdot (H_2+2\Delta_2)$ | $A \cdot (H_2+3\Delta_2)$ | $A \cdot (H_2+4\Delta_2)$ | |
| 85 — | $A \cdot (H_1+3\Delta_1)$ | | | | $A \cdot H_1$ | $A \cdot (H_1+\Delta_1)$ | $A \cdot (H_1+2\Delta_1)$ | $A \cdot (H_1+3\Delta_1)$ | | |
| 86 — | $A \cdot (H_2+3\Delta_2)$ | | | | $A \cdot H_2$ | $-A \cdot (H_2+\Delta_2)$ | $-A \cdot (H_2+2\Delta_2)$ | $A \cdot (H_2+3\Delta_2)$ | | |

| | Slot 14 | Frame boundary | | Slot 1 | | | |
|---|---|---|---|---|---|---|---|
| 101 — | A | A | A·H₁ | A | A·(H₁+Δ₁) | A·(H₁+2Δ₁) | A·(H₁+3Δ₁) | A·(H₁+4Δ₁) |
| 102 — | A | -A | A·H₂ | A | -A·(H₂+Δ₂) | A·(H₂+2Δ₂) | -A·(H₂+3Δ₂) | A·(H₂+4Δ₂) |
| 103 — | A·(H₁+3Δ₁) | A·(H₁+4Δ₁) | A·H₁ | A | A·(H₁+Δ₁) | A·(H₁+2Δ₁) | A·(H₁+3Δ₁) | A·(H₁+4Δ₁) |
| 104 — | A·(H₂+3Δ₂) | A·(H₂+4Δ₂) | A·H₂ | -A | -A·(H₂+Δ₂) | A·(H₂+2Δ₂) | -A·(H₂+3Δ₂) | A·(H₂+4Δ₂) |
| 105 — | A | -A | A | -A | A | -A | A | -A |
| 106 — | -A²·(H₁+3Δ₁) | A²·(H₁+4Δ₁) | A²·H₁ | -A²·(H₁+Δ₁) | A²·(H₁+2Δ₁) | -A²·(H₁+3Δ₁) | A²·(H₁+4Δ₁) |
| 107 — | -A²·(H₂+3Δ₂) | A²·(H₂+4Δ₂) | A²·H₂ | A²·(H₂+Δ₂) | -A²·(H₂+2Δ₂) | A²·(H₂+3Δ₂) | -A²·(H₂+4Δ₂) |
| 108 — | -A²·(H₁+3Δ₁) | | A²·H₁ | -A²·(H₁+Δ₁) | A²·(H₁+2Δ₁) | -A²·(H₁+3Δ₁) | |
| 109 — | -A²·(H₂+3Δ₂) | | A²·H₂ | A²·(H₂+Δ₂) | -A²·(H₂+2Δ₂) | A²·(H₂+3Δ₂) | |

US 9,509,366 B2

INTERFERENCE ESTIMATION CIRCUIT AND METHOD

BACKGROUND OF THE INVENTION

Field of the Invention

The invention relates to a direct sequence spread spectrum communication system, and more particularly to a code division multiple access receiver.

Description of the Related Art

Various wireless communication systems have adopted various schemes for supporting as many simultaneous users as possible. Code Division Multiple Access (CDMA) is one of such schemes. CDMA is a technique employed in spread spectrum communication systems that allows multiple users to simultaneously share the same frequency. In CDMA systems, a wideband spreading signal is used to convert a narrowband data signal into a wideband signal for transmission. Direct sequence spread spectrum (DSSS) systems use a pseudo noise (PN) sequence to spread the data signal into a wideband signal.

The signal to interference ratio (SIR) estimation is an important technique for CDMA receivers. In a CDMA receiver, many modern components utilize the SIR estimated result as a comparison threshold factor or as a decoding parameter, such as Multi-Path Searcher, Cell Searcher, Turbo Decoder, or Power controller. Especially in a power controller, the SIR estimation error is closely related to the power control error and therefore directly related to the service capacity. More precise SIR estimation improves system performance, and relies on more precise interference estimation.

Interference estimation estimates the interference power existing in received signals. The interference may include additive white Gaussian noise (AWGN) existing in passing channel, interference from other co-channel signals, interference from multi-path effects, interference from non-ideal demodulation process, and/or any other form of interference. One interference estimation method firstly re-builds the pure-signal component of the received signal in the receiver, and then subtracts the re-built pure-signal component from the total received signal to obtain an estimated interference component power. This method, however, is highly dependent on channel estimation precision to rebuild a reliable pure-signal component. Precise channel estimation is difficult in fast fading channels because the channel estimation algorithm may not be reliably for tracking the rapidly varying channel effect.

Another method utilizes the characteristics of orthogonal spreading code in the CDMA system. Because CDMA systems use orthogonal codes to distinguish different channels or users, and there always exists un-used orthogonal code, this method uses one un-used code to de-spread received signal for canceling the pure-signal component. For example, assuming interference is estimated by common pilot channel, and transmit diversity exists. In WCDMA systems with transmit diversity mode, common pilot symbols are orthogonally transmitted on 2 antennas as shown in FIG. 1. Another pattern, orthogonal to pilot symbol patterns on both antennas, can cancel the pure-signal by de-patterning the received symbol as shown in FIG. 2. In FIG. 2, pattern 21 is the pattern transmitted by antenna 1, pattern 22 is the pattern transmitted by antenna 2, and pattern 23 is the pattern for de-patterning the received symbol. Assuming that pattern 21 and pattern 22 are transmitted in a static channel, $H_{ant1,0} \sim H_{ant1,9}$ are the channel response of each symbol of slot 0 in pattern 21, and $H_{ant2,0} \sim H_{ant2,9}$ are the channel response of each symbol of slot 0 in pattern 22, then $H_{ant1,0}=H_{ant1,1}= \ldots =H_{ant1,9}$ and $H_{ant2,0}=H_{ant2,1}= \ldots =H_{ant2,9}$. The averaged de-patterning output for antenna 1 is 0, and the averaged de-patterning output for antenna 2 is $A^2 \cdot H_{ant2,0}/5$. Because no channel estimation result is required, the described method is generally more robust in fast-fading channels. Although the method performs better in a high speed environment, large interference power estimation offset still occurs when the Doppler frequency is high as shown in FIG. 3. In FIG. 3, assuming that pattern 21 and pattern 22 are transmitted in a fast-fading channel, $\Delta_{ant1}$, $H_{ant1,0} \sim H_{ant1,9}$ are the channel shift and channel response of each symbol caused by fading in antenna 1 and $\Delta_{ant2}$, $H_{ant2,0} \sim H_{ant2,9}$ are the channel shift and channel response of each symbol caused by fading in antenna 2. The averaged de-patterning output for antenna 1 is $A^2 \cdot \Delta_{ant1}/2$, and the averaged de-patterning output for antenna 2 is $A^2 \cdot (2H_{ant2,0}+9\Delta_{ant2})/10$.

Methods and apparatuses capable of more accurate interference estimation in high speed environments are thus desirable.

BRIEF SUMMARY OF INVENTION

The invention provides interference estimation circuits and methods for estimating interference in a received signal.

According to an aspect of the invention, an interference estimation circuit for estimating interference of a received signal comprises a signal generator, a first symbol extractor and a first mixer. The signal generator generates an orthogonal signal orthogonal to partial symbols of a plurality of pilot signals of the received signal. The first symbol extractor extracts partial symbols of a first decoded signal decoded from the received signal and outputs a first extracted signal wherein the first decoded signal contains one of the plurality of pilot signals. The first extracted signal is substantially orthogonal to the orthogonal signal. The first mixer is coupled to the signal generator for receiving the orthogonal signal and to the first symbol extractor for receiving the first extracted signal, and outputs a first mixed signal of the orthogonal signal and the first extracted signal for interference estimation.

The interference estimation circuit further comprises a decoder, a second symbol extractor and a second mixer. The decoder separates the received signal into the first decoded signal and a second decoded signal. The second symbol extractor extracts partial symbols of the second decoded signal and outputs a second extracted signal wherein the second decoded signal contains one of the plurality of pilot signals. The second extracted signal is substantially orthogonal to the orthogonal signal. The second mixer is coupled to the signal generator for receiving the orthogonal signal and to the second symbol extractor for receiving the second extracted signal, and outputs a second mixed signal of the orthogonal signal and the second extracted signal for interference estimation.

According to another aspect of the invention, an interference estimation circuit for estimating interference of a received signal comprises a signal generator, a first symbol extractor and a first mixer. The signal generator generates an orthogonal signal substantially orthogonal to a plurality of pilot signals of the received signal. The first mixer is coupled to the signal generator for receiving the orthogonal signal, receives a first decoded signal decoded from a received signal, and outputs a first mixed signal of the orthogonal signal and the first decoded signal. The first decoded signal contains one of the plurality pilot signals. The first symbol extractor is coupled to the first mixer for receiving the first mixed signal, extracts partial symbols of the first mixed signal according to the orthogonality of the first decoded signal and the orthogonal signal, and outputs a first extracted signal for interference estimation.

The interference estimation circuit further comprises a decoder, a second mixer and a second symbol extractor. The decoder separates the received signal into the first decoded signal and a second decoded signal. The second mixer is coupled to the signal generator for receiving the orthogonal signal and to the decoder for receiving the second decoded signal, and outputs a second mixed signal of the orthogonal signal and the second decoded signal. The second symbol extractor extracts partial symbols of the second mixed signal according to the orthogonality of the second decoded signal and the orthogonal signal and outputs a second extracted signal for interference estimation.

According to another aspect of the invention, an interference estimation method comprises the following steps. Step 1110 separates the received signal into a first decoded signal and a second decoded signal. Step 1120 generates an orthogonal signal orthogonal to partial symbols of the plurality of pilot signals of the received signal. Step 1130 extracts first and second extracted signal containing partial symbols of the first and second decoded signal that is substantially orthogonal to the orthogonal signal. Step 1140 mixes the orthogonal signal and the extracted signals and outputs mixed signals for interference estimation.

According to another aspect of the invention, an interference estimation method comprises the following steps. Step 1210 separates the received signal into a first decoded signal and a second decoded signal. Step 1220 generates an orthogonal signal orthogonal to a plurality of pilot signals of the received signal. Step 1230 mixes the orthogonal signal and the first decoded signal and outputting a first mixed signal, and mixes the orthogonal signal and the second decoded signal and outputting a second mixed signal. Step 1240 extracts partial symbols of the mixed signals according to the orthogonality of the decoded signals and the orthogonal signal and outputs extracted signals for interference estimation.

The received signal transmitted in accordance with antenna transmit diversity contains at least one frame, each frame contains a plurality of slots, and each slot contains a plurality of symbols. The extracted signal is extracted from N symbols of M slot of each of the received signal that is substantially orthogonal to the orthogonal signal wherein N and M are both positive integers. The symbols are extracted from first-N-symbol of first-M-slot in each frame, central-N-symbol of first-M-slot in each frame or last-N-symbol of first-M-slot in each frame.

A detailed description is given in the following embodiments with reference to the accompanying drawings.

BRIEF DESCRIPTION OF DRAWINGS

Invention can be more fully understood by reading the subsequent detailed description and examples with references made to the accompanying drawings, wherein:

FIG. 3 shows one example of fading effect in a high speed environment.

FIG. 5 shows the operation of the interference estimation circuit of FIG. 4.

FIG. 7 shows the operation of the interference estimation circuit in FIG. 6.

FIG. 8 shows selecting first 4 symbols per slot from a first and second signal.

FIG. 10 shows the operation of the interference estimation circuit in FIG. 9.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
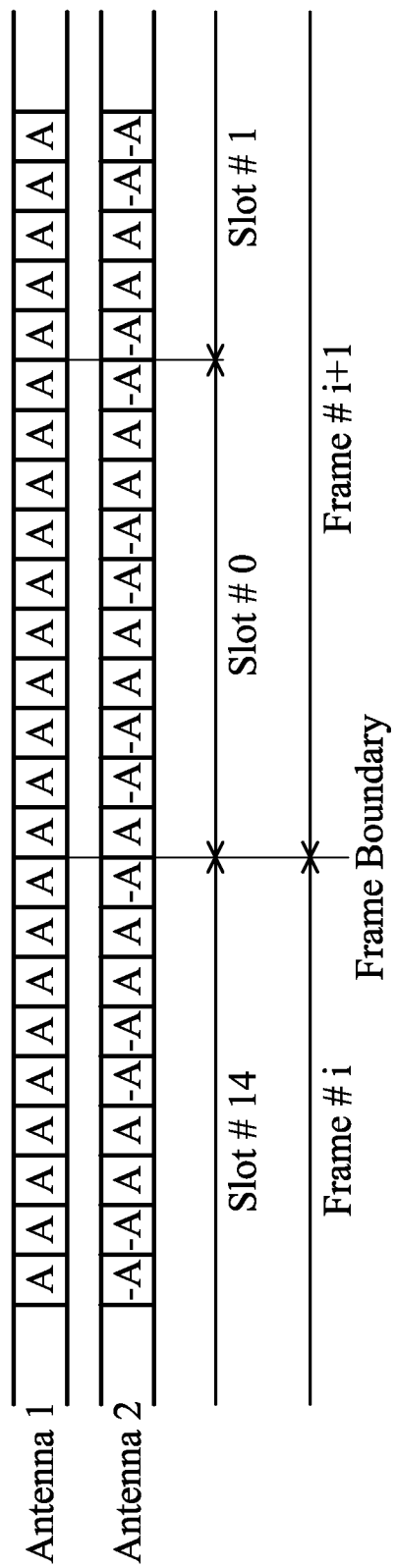
FIG. 1 shows that common pilot symbols are transmitted on 2 antennas, in WCDMA systems with transmit diversity mode.
Figure 2:
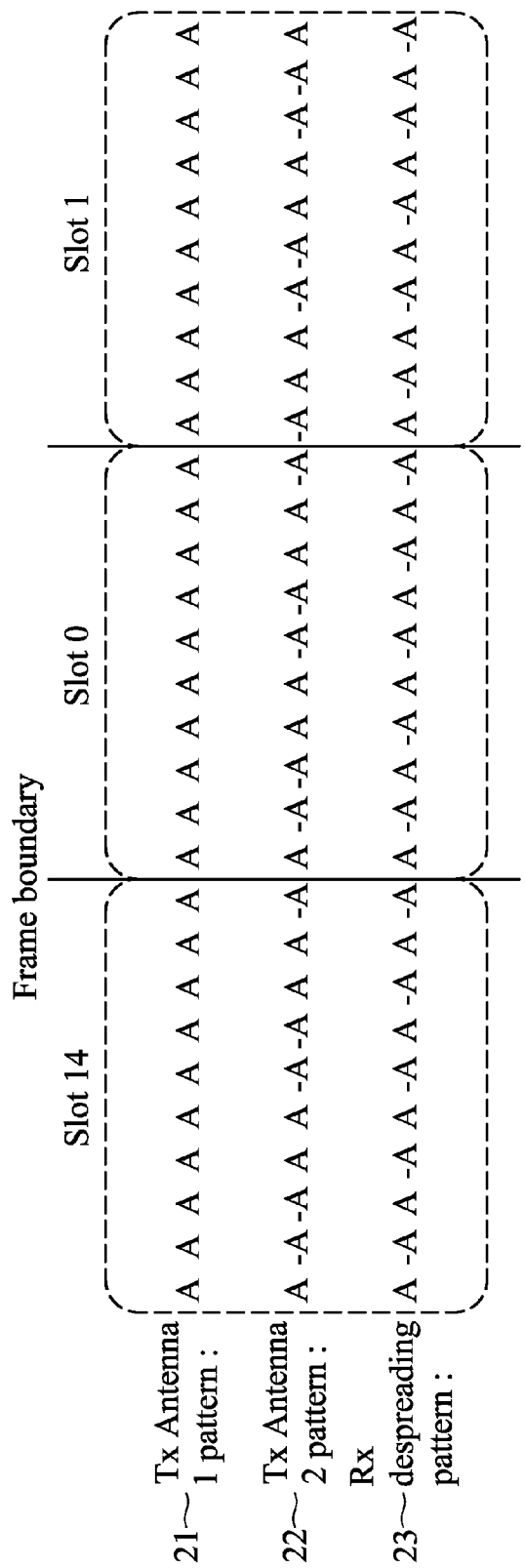
FIG. 2 shows patterns of transmitted signals and despreading signals.
Figure 4:
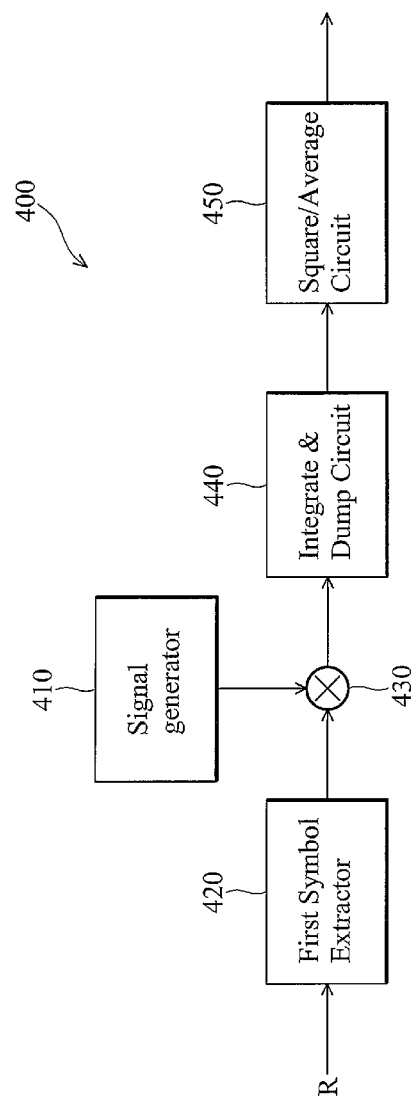
FIG. 4 shows the block diagram of an interference estimation circuit according to an embodiment of the invention.

FIG. 4 shows the block diagram of an interference estimation circuit according an embodiment of the invention. In FIG. 4, an interference estimation circuit 400 comprises a signal generator 410, a first symbol extractor 420, a first mixer 430 coupled to the output of the signal generator 410 and to the output of the first symbol extractor 420, an integrate & dump circuit 440 coupled to the first mixer 430, and a square/average circuit 450 coupled to the integrate & dump circuit 440. The signal generator 410 generates an orthogonal signal, which is orthogonal to partial symbols of a plurality of pilot signals. The plurality of pilot signals comprises control signals or a set of patterns known by the receiver. There are a number of well-known methods for selecting symbols and signals orthogonal to selected partial symbols of pilot signals. In embodiments of this invention, the signal generator 410 could utilize any known method for generating such an orthogonal signal. The first symbol extractor 420 extracts partial symbols of a received signal R wherein the received signal R contains pilot signals. The first symbol extractor 420 comprises an input node for receiving the received signal R, an output node for outputting an extracted signal. Neglecting the unexpected interference existing in the extracted signal, the extracted signal is substantially orthogonal to the orthogonal signal generated by the signal generator 410. It should be noted that the invention uses the orthgonality between a pure signal and the orthogonal signal to cancel the pure signal, so it is still robust even in such a situation that the unexpected interference existing in the extracted signal is bigger than the pure signal existing in the extracted signal. The first mixer 430 outputs a mixed signal of the orthogonal signal and the extracted signal. In theory, the mixed signal from the first mixer 430 shall contain no pure signal but interference and noise signal. The following integrate & dump circuit 440 and the square/average circuit 450 process the mixed signal for interference estimation Further detailed illustration of the foregoing operation of the embodiment shown in FIG. 4 is shown in FIG. 5. In FIG.

5, the transmit signal 51 is transmitted in a fading channel having channel response H and channel shift Δ. After the fading channel effect, each symbol of the received signal 52 has different interference. The extracted signal 53 is extracted by the first symbol extractor 420 from the received signal 52. In general, a transmit signal contains a plurality of slots in one frame and a plurality of symbols in one slot. Thus, a selected partial pilot signal, contains N symbols of M slots, is substantially orthogonal to an orthogonal signal generated at the receiver. N and M are both positive integers, for example, the central-8-symbol of 1 slot is used to denote 8 symbols which centrally reside in one slot. The orthogonal signal 54 generated by the signal generator 410 is orthogonal to some selected partial symbols of the plurality of pilot signals in the transmit signal, for example (A, −A, A, −A). Note that the pattern selected is not unique. For example, (A, A, −A, −A) is another candidate. The character, "A" or "−A", represents a symbol in each signal. The symbol level signal is decoded from a received signal and is provided for illustration only. The foregoing process can be performed at the chip level or other. The extracted signal 53 and the orthogonal signal 54 are sent to the first mixer 430, and then the mixed signal 55 is processed by the integrate & dump circuit 440 and the square/average circuit 450 for interference estimation.

Figure 6:
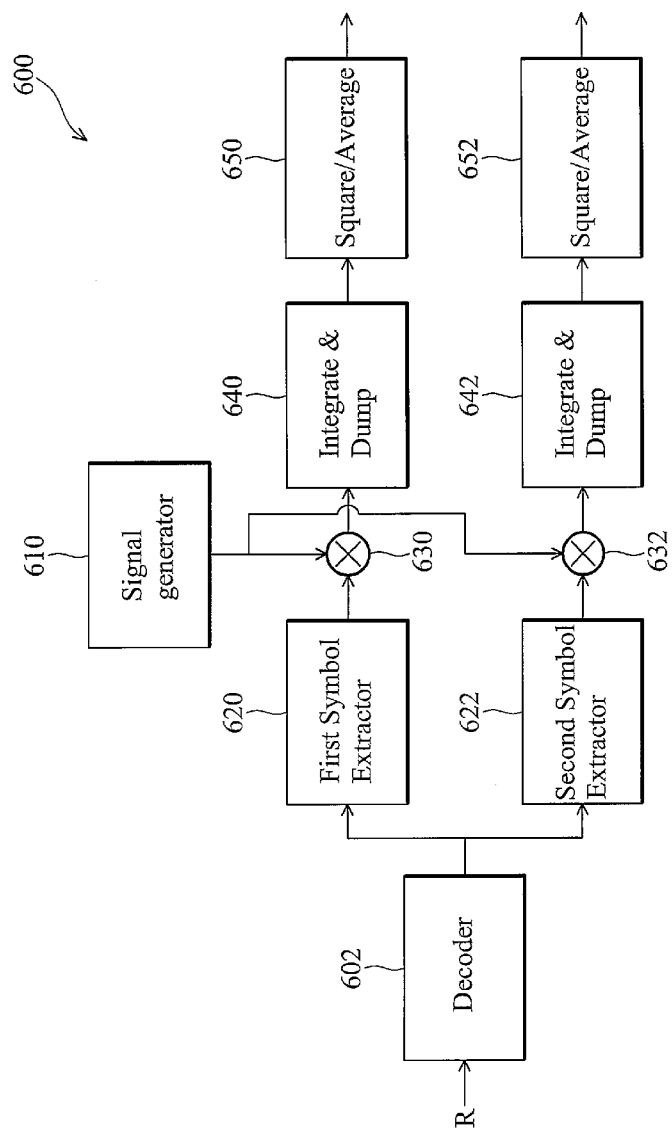
FIG. 6 shows the block diagram of an interference estimation circuit according to another embodiment of the invention.

FIG. 6 shows the block diagram of an interference estimation circuit according to another embodiment of the invention. In FIG. 6, an interference estimation circuit 600 comprises a decoder 602, a signal generator 610, a first symbol extractor 620, a second symbol extractor 622, a first mixer 630, a second mixer 632, an integrate & dump circuit 640, a square/average circuit 650, an integrate & dump circuit 642 and a square/average circuit 652. In a practical communication system, for example, in the CDMA system, the transmit diversity technique is typically utilized to reduce the fading effect. The decoder 602 separates the received signal R into a first decoded signal and a second decoded signal by orthogonal patterns corresponding to each transmitting antenna, respectively. The signal generator 610 generates an orthogonal signal orthogonal to partial symbols of a plurality of pilot signals. The plurality of pilot signals is control signals or a set of patterns known by the receiver. There are a number of well-known methods for selecting symbols and signals orthogonal to selected partial symbols of pilot signals. In embodiments of this invention, the signal generator 610 could utilize any known method for generating such an orthogonal signal.

The first symbol extractor 620 and the second symbol extractor 622 extract partial symbols of the first decoded signal and the second decoded signal, respectively. Assuming the received signal R contains at least two mutual orthogonal pilot signals, the first decoded signal contains one of pilot signals, and the second decoded signal contains another one of pilot signals. Each of the first symbol extractor 620 and the second symbol extractor 622 comprises an input node for receiving the received signal R, an output node for respectively outputting a first extracted signal and a second extracted signal. The first mixer 630 outputs a first mixed signal of the orthogonal signal and the first extracted signal. The second mixer 632 outputs a second mixed signal of the orthogonal signal and the second extracted signal. The following integrate & dump circuit 640 and the square/average circuit 650 process the first mixed signal for interference estimation. The following integrate & dump circuit 642 and the square/average circuit 652 process the second mixed signal for interference estimation.

Further detailed illustration of the foregoing operation of embodiment shown in FIG. 6 is shown in FIG. 7. In FIG. 7, the transmit signal 71 is transmitted in a fading channel having channel response $H_1$ and channel shift $\Delta_1$ and the transmit signal 72 is transmitted in a fading channel having channel response $H_2$ and channel shift $\Delta_2$. After decoding and the fading channel effect, each symbol of the first and second decoded signals 73 and 74 has different levels of interference. The first and second extracted signal 75 and 76 are extracted by the first and second symbol extractor 620 and 622, respectively. The orthogonal signal 77 generated by the signal generator 610 is orthogonal to the selected partial symbols of the plurality of pilot signals in the first and second transmit signals, for example (A, −A, A, −A). Note that the pattern selection is not unique. For example, (A, A, −A, −A) is another candidate. The characters, "A" or "−A", represent a symbol in each signal. The symbol level signal is only for illustration, certainly, the foregoing process can be done in chip level or else. The first and second extracted signal 75 and 76 and the orthogonal signal 77 are sent to the first and second mixer 630 and 632, respectively. The first and second mixed signal 78, 79 are processed by the first and second integrate & dump circuit 640 and 642 as well as subsequently the first and second square/average circuit 650 and 652 for interference estimation, respectively.

An extracted signal extracted by a symbol extractor is partial symbols of a signal, and there are a number of methods for selecting partial symbols from the signal. In general, a transmit signal contains a plurality of slots in one frame and a plurality of symbols in one slot. Thus, a selected partial pilot signal, contains N symbols of M slots, is substantially orthogonal to an orthogonal signal generated at the receiver. N and M are both positive integers, for example, the central-N-symbol of the M slots or first-N-symbol of M slots could be selected in the embodiments according to the invention. Further, the patterns of the signal continuously crossing frame boundary (e.g., Slot14-Slot0, in FIG. 8) or slot boundary (e.g., Symbol 9-Symbol 0, in FIG. 8) may be different from those patterns selected in the same slot, thus, a special process is required while the selected M slots crossing the frame boundary or the slot boundary. In order to prevent the problem of crossing the frame boundary, the value of M can be a factor of the number of slots in one frame.

In practice, better methods, in accordance with some kinds of the communication specifications, for specific communication systems exist. For example, in a CDMA communication system with transmit diversity mode, a way for selecting partial symbols of a signal transmitted by a CDMA common pilot channel is to select first-4-symbols per slot. For those embodiments in accordance with 3GPP WCDMA specification, each symbol consists of 512 chips. As shown in FIG. 8, a first and second transmit signal 81, 82 are transmitted by antenna 1, 2, respectively. After decoding and respective fading channel effect, each symbol of a first and second decoded signal 83 and 84 has different interference. Further a first and second extracted signal 85 and 86 is extracted based on the foregoing selecting way.

Figure 9:
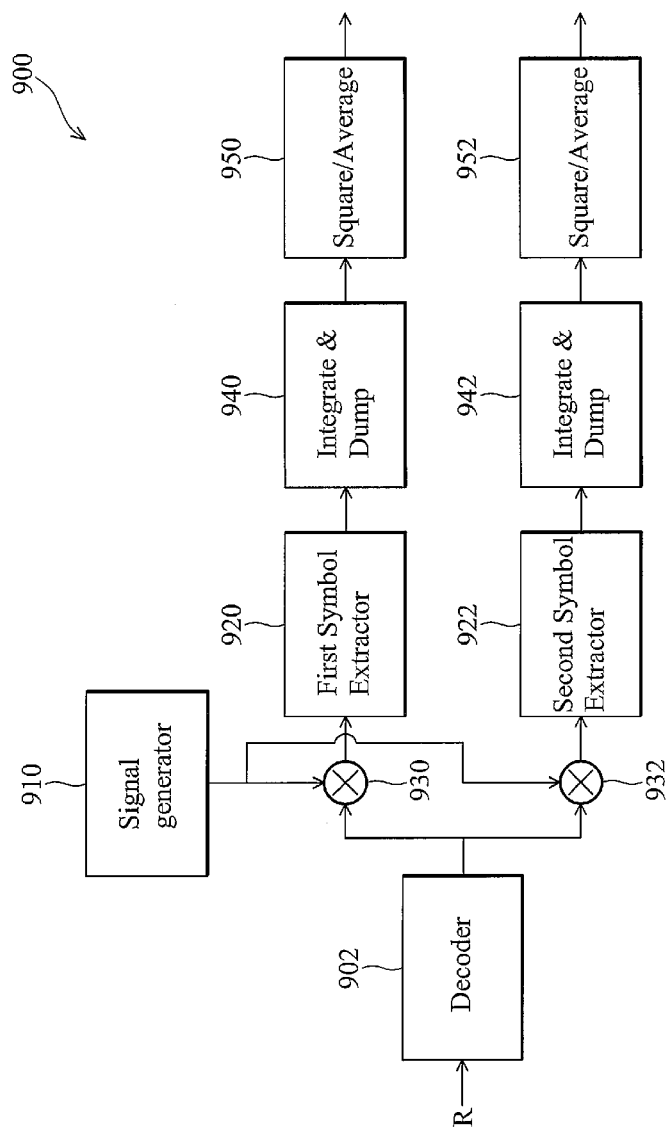
FIG. 9 shows the block diagram of an interference estimation circuit according to another embodiment of the invention.

FIG. 9 shows the block diagram of an interference estimation circuit 900 according to another embodiment of the invention. In FIG. 9, an interference estimation circuit 900 comprises a decoder 902, a signal generator 910, a first symbol extractor 920, a second symbol extractor 922, a first mixer 930, a second mixer 932, an integrate & dump circuit 940, a square/average circuit 950, an integrate & dump circuit 942 and a square/average circuit 952. In a practical communication system, for example, in the CDMA system, the transmit diversity technique is typically used to reduce the fading effect. The decoder 902 separates the received signal R into a first decoded signal and a second decoded signal by orthogonal patterns corresponding to each transmitting antenna, respectively. The signal generator 910 generates an orthogonal signal substantially orthogonal to a plurality of pilot signals. The orthogonal signal is orthogonal to most bits of the pilot signals, for example 80% of the bits. The plurality of pilot signals control signals or a set of patterns known by the receiver. There are a number of well-known methods for selecting symbols and signals orthogonal to selected partial symbols of pilot signals. In embodiments of this invention, the signal generator 910 could utilize any known method for generating such an orthogonal signal.

The first decoded signal contains one of pilot signals, and the second decoded signal contains another one of pilot signals. The first mixer 930 outputs a first mixed signal of the orthogonal signal and the first decoded signal. The second mixer 932 outputs a second mixed signal of the orthogonal signal and the second decoded signal. The first and second symbol extractor extract partial symbols of the first and second mixed signal according to the orthogonality of the first and second decoded signal and the orthogonal signal, respectively. The following integrate & dump circuit 940 and the square/average circuit 950 process the first extracted signal for interference estimation. The following integrate & dump circuit 942 and the square/average circuit 952 process the second extracted signal for interference estimation.

Further detailed illustration of the foregoing operation of embodiment shown in FIG. 9 is shown in FIG. 10. For example, in a CDMA communication system with transmit diversity mode, antennas 1 and 2 respectively transmit a first and second transmit signal 101 and 102 through common pilot channel. After decoding and respective fading channel effect, each symbol of a first and second decoded signal 103 and 104 has a different interference level. The signal generator 910 generates an orthogonal signal 105. The first and second mixer 930 and 940 mix the orthogonal signal 105 and a first and second decoded signal 103 and 104, and outputs a first and second mixed signal 106 and 107, respectively. For those embodiments in accordance with 3GPP WCDMA specification, each symbol consists of 512 chips. The first and second symbol extractor 920 and 922 extract the first-4-symbols per slot from the first and second mixed signal 106, 107 according to the orthogonality of the first and second decoded signal 103 and 104 and the orthogonal signal, and output a first and second extracted signal 108 and 109, respectively. Another method for extracting partial symbols selects the first-N-symbol of the M slots of the signal, for example the first-14-symbols of the first 3 slots in a frame.

Figure 11:
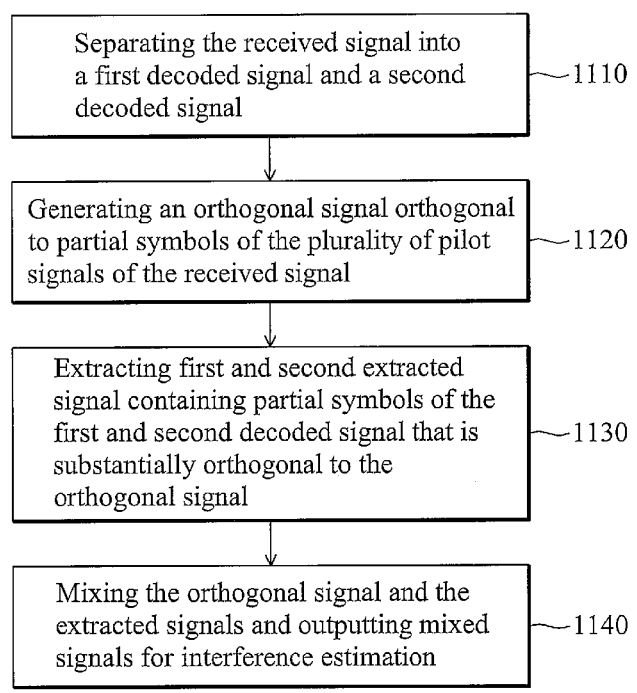
FIG. 11 is a flow chart shown an interference estimation method according to another embodiment of the invention.

FIG. 11 is a flow chart shown an interference estimation method 1100 according to another embodiment of the invention. For estimating interference of a received signal transmitted in accordance with antenna transmit diversity, step 1110 separates the received signal into a first decoded signal and a second decoded signal. Step 1120 generates an orthogonal signal orthogonal to partial symbols of the plurality of pilot signals of the received signal. Step 1130 extracts first and second extracted signal containing partial symbols of the first and second decoded signal that is substantially orthogonal to the orthogonal signal. Step 1140 mixes the orthogonal signal and the extracted signals and outputting mixed signals for interference estimation.

Figure 12:
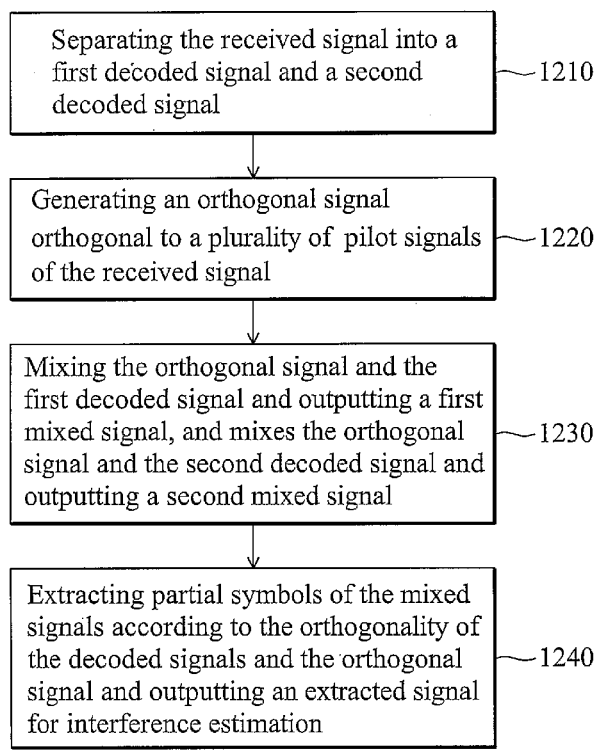
FIG. 12 is a flow chart shown an interference estimation method according to another embodiment of the invention

FIG. 12 is a flow chart shown an interference estimation method 1200 according to another embodiment of the invention. For estimating interference of a received signal transmitted in accordance with antenna transmit diversity, step 1210 separates the received signal into a first decoded signal and a second decoded signal. Step 1220 generates an orthogonal signal orthogonal to a plurality of pilot signals of the received signal. Step 1230 mixes the orthogonal signal and the first decoded signal and outputting a first mixed signal, and mixes the orthogonal signal and the second decoded signal and outputting a second mixed signal. Step 1240 extracts partial symbols of the mixed signals according to the orthogonality of the decoded signals and the orthogonal signal and outputs an extracted signal for interference estimation.

In methods 1100 and 1200, the received signal contains at least one frame, each frame contains a plurality of slots, and each slot contains a plurality of symbols. The extracted signal is extracted from N symbols of M slot of each of the received signal that is substantially orthogonal to the orthogonal signal wherein N and M are both positive integers. The symbols are extracted from first-N-symbol of first-M-slot in each frame, central-N-symbol of first-M-slot in each frame or last-N-symbol of first-M-slot in each frame.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An interference estimation circuit in a receiver, for estimating interference of a received signal, comprising:
   a decoder, for separating the received signal transmitted in accordance with antenna transmit diversity into the first decoded signal and a second decoded signal by orthogonal patterns corresponding to each transmitting antenna of a transmitter, wherein the received signal comprises a pure signal and an interference signal, wherein the pure signal comprises a signal transmitted by the transmitter to the receiver;
   a signal generator, for generating an orthogonal signal orthogonal to partial symbols of a plurality of pilot signals of the received signal, wherein the generated orthogonal signal comprises an orthogonal code un-used by the transmitter;
   a first symbol extractor, for extracting partial symbols of the first decoded signal and outputting a first extracted signal, wherein the first decoded signal contains one of the plurality of pilot signals,
   a second symbol extractor, for extracting partial symbols of the second decoded signal and outputting a second extracted signal,
   wherein the first extracted signal is substantially orthogonal to the orthogonal signal; and
   a first mixer, coupled to the signal generator for receiving the orthogonal signal, coupled to the first symbol extractor for receiving the first extracted signal, outputting a first mixed signal of the orthogonal signal and the first extracted signal for interference estimation,
   wherein the first mixed signal is generated by canceling the pure signal of the first decoded signal such that the first mixed signal is a first interference signal of the interference signal of the received signal, the first interference signal resulting from a respective fading channel effect corresponding to the first decoded signal, and wherein each of the first symbol extractor and the second symbol extractor comprises an input node for respectively receiving the first decoded signal and the second decoded signal, and an output node for respectively outputting a first extracted signal and a second extracted signal.

2. The interference estimation circuit of claim 1, wherein the first decoded signal contains at least one frame, each frame contains a plurality of slots, and each slot contains a plurality of symbols, wherein the first symbol extractor extracts N symbols of M slot of each frame that are substantially orthogonal to the orthogonal signal, where N and M are both positive integers.

3. The interference estimation circuit of claim 2, wherein the symbols are extracted from one of the following groups:
first-N-symbol of first-M-slot in each frame;
central-N-symbol of first-M-slot in each frame; and
last-N-symbol of first-M-slot in each frame.

4. The interference estimation circuit of claim 1, further comprising:

a second symbol extractor, for extracting partial symbols of the second decoded signal and outputting a second extracted signal, wherein the second decoded signal contains one of the plurality of pilot signals, wherein the second extracted signal is substantially orthogonal to the orthogonal signal; and a second mixer, coupled to the signal generator for receiving the orthogonal signal, coupled to the second symbol extractor for receiving the second extracted signal, outputting a second mixed signal of the orthogonal signal and the second extracted signal for interference estimation, wherein the second mixed signal is generated by canceling the pure signal of the second decoded signal such that the second mixed signal comprises a second interference signal of the interference signal from the received signal.

5. An interference estimation circuit in a receiver, for estimating interference of a received signal, comprising:

a decoder, for separating the received signal into a first decoded signal and a second decoded signal, wherein the received signal comprises a pure signal and an interference signal, wherein the pure signal comprises a signal transmitted by a transmitter to the receiver;

a signal generator, for generating an orthogonal signal substantially orthogonal to a plurality of pilot signals of the received signal, wherein the generated orthogonal signal comprises an orthogonal code un-used by the transmitter;

a first mixer, coupled to the signal generator for receiving the orthogonal signal, wherein the first mixer further configured for receiving the first decoded signal decoded from the received signal and outputting a first mixed signal of the orthogonal signal and the first decoded signal, wherein the first decoded signal contains one of the plurality pilot signals; and a first symbol extractor, coupled to the first mixer for receiving the first mixed signal, extracting partial symbols of the first mixed signal according to the orthogonality of the first decoded signal and the orthogonal signal, and outputting a first extracted signal for interference estimation, a second symbol extractor, for extracting partial symbols of the second decoded signal and outputting a second extracted signal, wherein the first mixed signal is generated by canceling the pure signal of the first decoded signal such that the first extracted signal is a first interference signal of the interference signal of the received signal, and wherein each of the first symbol extractor and the second symbol extractor comprises an input node for respectively receiving the first decoded signal and the second decoded signal, and an output node for respectively outputting the first extracted signal and the second extracted signal.

6. The interference estimation circuit of claim 5, wherein the first mixed signal contains at least one frame, each frame contains a plurality of slots and each slot contains a plurality of symbols, wherein the first symbol extractor extracts N symbols of M slot of each frame that are substantially orthogonal to the orthogonal signal from the mixed signal, where N and M are both positive integers.

7. The interference estimation circuit of claim 6, wherein the symbols are extracted from one of the following groups:
first-N-symbol of first-M-slot in each frame;
central-N-symbol of first-M-slot in each frame; and
last-N-symbol of first-M-slot in each frame.

8. The interference estimation circuit of claim 5, wherein the received signal is transmitted in accordance with antenna transmit diversity.

9. The interference estimation circuit of claim 5, further comprising:

a second mixer, coupled to the signal generator for receiving the orthogonal signal and coupled to the decoder for receiving the second decoded signal, wherein the second mixer is further configured for outputting a second mixed signal of the orthogonal signal and the second decoded signal; and the second symbol extractor, coupled to the second mixer for receiving the second mixed signal, extracting from the second mixed signal partial symbols of the second mixed signal according to the orthogonality of the second decoded signal and the orthogonal signal, and outputting a second extracted signal for interference estimation, wherein the second mixed signal is generated by canceling the pure signal of the second decoded signal such that the second extracted signal is a second interference signal of the interference signal from the received signal.

10. An interference estimation method implemented in a receiver, for estimating interference of a received signal, comprising:

separating the received signal transmitted in accordance with antenna transmit diversity into a first decoded signal and a second decoded signal by orthogonal patterns corresponding to each transmitting antenna of a transmitter, wherein the received signal comprises a pure signal and an interference signal, wherein the pure signal comprises a signal transmitted by the transmitter to the receiver;

generating an orthogonal signal orthogonal to partial symbols of a plurality of pilot signals of the received signal, wherein the generated orthogonal signal comprises an orthogonal code un-used by the transmitter;

extracting, by a first symbol extractor, a first extracted signal containing partial symbols of the first decoded signal that is substantially orthogonal to the orthogonal signal;

extracting, by a second symbol extractor, partial symbols of the second decoded signal and outputting a second extracted signal; and mixing the orthogonal signal and the first extracted signal for outputting a first mixed signal for interference estimation, wherein the first mixed signal is generated by canceling the pure signal of the first decoded signal such that the first mixed signal is a first interference signal of the interference signal of the received signal the first interference signal resulting from a respective fading channel effect corresponding to the first decoded signal.

11. The interference estimation method of claim 10, wherein the received signal contains at least one frame, each frame contains a plurality of slots, and each slot contains a plurality of symbols, wherein the extracted signal is extracted from N symbols of M slot of each of the received signal that is substantially orthogonal to the orthogonal signal, where N and M are both positive integers.

12. The interference estimation method of claim 11, wherein the symbols are extracted from one of the following groups:

first-N-symbol of first-M-slot in each frame;
central-N-symbol of first-M-slot in each frame; and
last-N-symbol of first-M-slot in each frame.

13. The interference estimation method of claim 10, further comprising:

extracting an second extracted signal containing partial symbols of the second decoded signal that is substantially orthogonal to the orthogonal signal; and mixing the orthogonal signal and the second extracted signal for outputting a second mixed signal for interference estimation, wherein the second mixed signal is generated by canceling the pure signal of the second decoded signal such that the second mixed signal comprises a second interference signal of the interference signal from the received signal.

14. An interference estimation method implemented in a receiver, for estimating interference of a received signal, comprising:

separating the received signal into a first decoded signal and a second decoded signal, wherein the received signal comprises a pure signal and an interference signal, wherein the pure signal comprises a signal transmitted by a transmitter to the receiver;

generating an orthogonal signal orthogonal to a plurality of pilot signals of the received signal, wherein the generated orthogonal signal comprises an orthogonal code un-used by the transmitter;

mixing the orthogonal signal and the first decoded signal decoded from the received signal for outputting a first mixed signal, wherein the first decoded signal contains one of the plurality of pilot signals; and receiving, by a first symbol extractor, the first mixed signal and extracting from the first mixed signal a first extracted signal containing partial symbols of the first mixed signal according to the orthogonality of the first decoded signal and the orthogonal signal and outputting the first extracted signal for interference estimation, and extracting, by a second symbol extractor, partial symbols of the second decoded signal and outputting a second extracted signal;

wherein the first mixed signal is generated by canceling the pure signal of the first decoded signal such that the first extracted signal is a first interference signal of the interference signal of the received signal, and wherein each of the first symbol extractor and the second symbol extractor comprises an input node for respectively receiving the first decoded signal and the second decoded signal, and an output node for respectively outputting the first extracted signal and the second extracted signal.

15. The interference estimation method of claim 14, wherein the first mixed signal contains at least one frame, each frame contains a plurality of slots, and each slot contains a plurality of symbols, wherein the first extracted signal is extracted from N symbols of M slot of each of the first mixed signal that is substantially orthogonal to the orthogonal signal, where N and M are both positive integers.

16. The interference estimation method of claim 15, wherein the symbols are extracted from one of the following groups:

first-N-symbol of first-M-slot in each frame;
central-N-symbol of first-M-slot in each frame; and
last-N-symbol of first-M-slot in each frame.

17. The interference estimation method of claim 14, wherein the received signal is transmitted in accordance with antenna transmit diversity.

18. The interference estimation method of claim 14, further comprising:

mixing the orthogonal signal and the second decoded signal for outputting a second mixed signal, wherein the second decoded signal contains one of the plurality of pilot signals; and extracting from the second mixed signal, by the second symbol extractor, the second extracted signal containing partial symbols of the second mixed signal according to the orthogonality of the second decoded signal and the orthogonal signal and outputting the second extracted signal for interference estimation, wherein the second mixed signal is generated by canceling the pure signal of the second decoded signal such that the second extracted signal is a second interference signal of the interference signal from the received signal.

* * * * *